United States Patent [19]

Elmer

[11] 4,049,603

[45] Sept. 20, 1977

[54] ADHESION OF GLASS FIBERS TO RUBBER

[75] Inventor: Otto C. Elmer, Akron, Ohio

[73] Assignee: The General Tire & Rubber Company, Akron, Ohio

[21] Appl. No.: 648,439

[22] Filed: Jan. 12, 1976

Related U.S. Application Data

[62] Division of Ser. No. 523,645, Nov. 13, 1974, Pat. No. 3,955,033.

[51] Int. Cl.$^2$ .................. C08L 91/06; C08L 61/12
[52] U.S. Cl. .................. 260/28.5 R; 260/28 P; 260/29.3; 428/268; 428/273; 428/278; 428/295; 428/378; 428/436; 428/494; 428/501
[58] Field of Search .............. 260/29.3, 28.5 R, 57 R, 260/57 C, 54, 844, 28 P

[56] References Cited

U.S. PATENT DOCUMENTS

| | | | |
|---|---|---|---|
| 1,975,884 | 10/1934 | Weith | 260/57 |
| 3,837,897 | 9/1974 | Marzocchi | 260/29.3 |
| 3,861,980 | 1/1975 | Wise | 260/29.3 X |
| 3,876,620 | 4/1975 | Moss | 260/57 R |
| 3,895,163 | 7/1975 | Elmer | 260/29.3 X |
| 3,896,253 | 7/1975 | Elmer | 260/29.3 X |
| 3,930,095 | 12/1975 | Van Gils et al. | 428/251 |

OTHER PUBLICATIONS

Chem. Abstracts, vol. 74, No. 4, Jan. 25, 1971, p. 25 (13787q).

*Primary Examiner*—Theodore E. Pertilla

[57] ABSTRACT

An aqueous alkaline dispersion of a rubbery vinyl pyridine copolymer and a water soluble, heat reactable o-cresol-formaldehyde-resorcinol resin, in certain amounts, is useful in forming an adhesive for bonding glass fiber reinforcing elements or cords to rubber compounds or stocks. After dipping the glass fiber cord in the one-step adhesive dip, the coated cord is heated to dry it and heat cure or heat set the adhesive on the cord. Thereafter, the adhesive containing glass fiber cord is combined or laminated (calendered) with a curable rubber compound and the resulting assembly is cured to form a composite in which the glass fiber cord is bonded to the rubber by means of said adhesive.

10 Claims, No Drawings

ADHESION OF GLASS FIBERS TO RUBBER

This application is a division of copending U.S. patent application Ser. No. 523,645 filed Nov. 13, 1974, entitled "ADHESION OF GLASS FIBERS TO RUBBER," now U.S. Pat. No. 3,955,033, granted May 4, 1976.

OBJECTS

An object of the invention is to provide a composite of a glass fiber reinforcing element adhesively bonded to a rubber compound, e.g., glass fiber tire cords adhesively bonded to provide carcass plies and belt plies for making tires. Another object is to provide glass fiber reinforcing elements, e.g., such as those used in the belt and the carcass plies to tires, with a minor amount of an adhesive so that the adhesive containing elements may subsequently be bonded to rubber on curing. A further object is to provide a method for bonding glass fibers, particularly glass fiber textiles, fibers, cords and so forth, to rubber compounds using a single dip. A still further object is to provide a glass fiber or cord adhesive dip composition. These and other objects and advantages of the present invention will become more apparent to those skilled in the art from the following detailed description and working examples.

SUMMARY OF THE INVENTION

According to the present invention it has been discovered that a composition comprising an aqueous alkaline dispersion of 100 parts by weight (dry) of a rubbery vinyl pyridine copolymer, from about 8 to 75 parts by weight of a heat reactable water soluble o-cresol-formaldehyde-resorcinol resin, and from about 250 to 1100 parts by weight of water, is very useful as a treating, dipping or coating material for use in bonding glass fiber reinforcing elements to rubber compounds. Preferably, the o-cresol is reacted with the formaldehyde before the resorcinol is reacted to form the resin to avoid free o-cresol in the dip and, also, possibly in the cord. Sufficient alkaline material such as aqueous KOH or NaOH may be added to the dispersion (or to one or more of the ingredients of the dispersion before mixing them together) to obtain the desired pH, prevent coagulation of the latex and to provide for stabilization. This will vary with the pH of the resin and the latex, all of which may vary from batch to batch. Since the amount of each compound may vary, the amount of alkaline material required can also vary. After drying the adhesive on the glass fiber reinforcing element to remove water and to heat cure or heat set the adhesive on the element, the adhesive containing element can then be combined or calendered with a curable rubber compound and the resulting assembly cured, usually in a mold, to provide a laminate exhibiting good adhesive properties. The use of o-cresol in making the cord dips gives more stable dips and adhesives which are softer and have a lower modulus and which may provide for better tire performance by giving less cord breakage. Moreover, o-cresol is an economical monomer to employ.

The present method involves only one dipping step, and the process or method can be varied to provide the desired pick-up or solids on the cord by varying the concentration of the dip or the speed of the cord through the dip to give the amount needed to develop the requisite adhesive bond. Thus, while the cord can be run through successive dips of the same or varying amounts of the above materials to get the desired buildup, this is unnecessary as satisfactory results can be accomplished in one dip. Pre or post dips of other adhesive compositions are unnecessary when using the present aqueous adhesive dip.

DISCUSSION OF DETAILS AND PREFERRED EMBODIMENTS

The glass fiber reinforcing element or cord comprises a plurality of substantially continuous and parallel glass fibers or monofilaments. The reinforcing element or fibers contain little or no twist. In other words, twist is not intentionally applied to the element or fibers; the only twist, if any, in the element or fibers is that occasioned on passing through the glass fiber processing apparatus and on packaging or winding up the cord to form a bobbin or spool. However, in a continuous process, the elements can proceed directly from the glass processing apparatus, can be dipped in the aqueous adhesive cord dip, dried, and given a twist of about 1.5 turns per inch thereafter. The elements then are woven into tire fabric having about one quite small pick thread or element, nylon or polyester, which may be a monofilament, per inch and calendered with a rubber ply or skim stock. The glass fiber reinforced ply stock is then ready to be used in the manufacture of a tire or for other purposes.

Glass compositions useful in making the fibers for the reinforcing element or glass tire cord are well known to the art. One of the preferred glasses to use is a glass known as E glass and described in "Mechanics of Pneumatic Tires," Clark, National Bureau of Standards Monograph 122, U.S. Dept. of Commerce, issued November, 1971, pages 241-243, 290, and 291. The number of glass filaments or fibers employed in the glass fiber reinforcing element or cord can vary considerably depending on the ultimate use or service requirements. Likewise, the number of strands of glass fibers used to make a glass fiber reinforcing element or cord can vary widely. In general, the number of filaments in the glass fiber reinforcing element or cord for a passanger car tire can vary from about 500 to 3,000 and the number of strands in the reinforcing element can vary from 1 to 10, preferably the number of strands is from 1 to 7 and the total number of filaments about 2000. A representative industry tire cord known as G-75 (or G-75, 5/0) has 5 strands each with 408 glass filaments. Another representative cord known as G-15 has a single strand containing 2040 glass filaments. In this connection reference is made to Wolf, "Rubber Journal," February, 1971, pages 26 and 27 and U.S. Pat. No. 3,433,689.

Shortly after the glass fibers are formed they are usually sized (by spraying or dipping and so forth and air drying) with a very small amount of fractional amount by weight of a material which acts as a protective coating during processing and handling of the glass fibers in forming the strands or reinforcing elements and during packaging. During the subsequent dipping in the aqueous adhesive tire cord dip, it is believed that the size is not removed. Materials for use as sizes for glass fibers are well known to the art. It is preferred to use a silane as a size, especially a silane which has groups which can bond or coordinate chemically or physically with at least parts of the surface of the glass of the glass fiber and with at least one or more of the components of the glass fiber aqueous adhesive cord dip. A very useful size to employ on the glass fibers is gamma-aminopropyl triethoxy silane, or similar aminoalkyl alkoxy silanes, which, when applied to the glass fibers, hydrolyzes and polymerizes to form a poly(aminosiloxane) in which a portion of the polymer is attached to the glass and another portion contains amine groups (having active hydrogen atoms) for reaction with components of the cord dip such as the CFR resin or the vinyl pyridine copolymer compound. Glass fiber sizing compounds are known, and some compositions are shown in U.S. Pat. Nos. 3,252,278; 3,287,204; and 3,538,974.

The type of rubber latex used in the tire cord dip bath of this invention is a latex of a copolymer of a vinyl pyridine and a conjugated diolefin having 4 to 6 carbon atoms. The rubber latex is of the type described in U.S. Pat. No. 2,561,215 and comprises an aqueous dispersion of a copolymer of 50 to 95 percent by weight of a conjugated diolefin having 4 to 6 carbon atoms, 5 to 40 percent of a vinyl pyridine and 0 to 40 percent of a styrene. Examples of suitable vinyl pyridines are 2-vinyl pyridine, 4-vinyl pyridine, 2-methyl-5-vinyl pyridine, and 5-ethyl-2-vinyl pryridine.

In practicing this invention, it is usually preferred to use a latex of a terpolymer of from about 60 to 80% by weight butadiene-1,3, about 7 to 32% styrene and about 5 to 22% of 2-vinyl pyridine having a total solids content of around 30 to 50% by weight. Also, blends of latices may be used such as a blend of a butadiene-1,3/2-vinyl pyridine rubbery copolymer latex and a butadiene-1,3/styrene rubbery copolymer latex or a blend of a butadiene-1,3/styrene/2-vinyl pyridine rubbery copolymer latex and a butadiene-1,3/styrene rubbery copolymer latex so long as the percent by weight ratio of total monomers in the copolymers is within the ranges as specified above. The pH of the latices should be similar and the surfactants and stabilizers including freeze stabilizers should be compatible to avoid coagulation on blending or mixing of the latices. The polymers from these latices have Mooney viscosities ML-4 min. at 212° F. of from about 40 to 120. Further disclosures of rubbery vinyl pyridine copolymer latices may be found in U.S. Pat. Nos. 2,615,826 and 3,437,122.

The water soluble, heat reactable o-cresol-formaldehyde-resorcinol resin is made by reacting formaldehyde with o-cresol and resorcinol in aqueous media using sodium hydroxide and/or potassium hydroxide and the like as a catalyst. The mol ratio of the o-cresol to the resorcinol is from about 1:1 to 1:5. The formaldehyde is used in a molar excess over the total mols of o-cresol and resorcinol. Preferably, the mol ratio of the total mols of the o-cresol plus the resorcinol to the mols of formaldehyde is from about 1:1.4 to 1:2.0. Such resins cure by the application of heat. See "The Chemistry of Phenolic Resins," Martin, John Wiley & Sons, Inc., New York, 1956. The ratio dry of the vinyl pyridine copolymer to the resin is from about 100:8 to 100:75 parts by weight, preferably from about 100:10 to 100:55 parts by weight.

Water is used in an amount sufficient to provide for the desired dispersion of the rubber or latex particles, and for the solution of the o-cresol-formaldehyde-resorcinol resin, to obtain the desired viscosities, and for the proper solids content to get the necessary pickup of solids on and penetration between the fibers of the cord.

Based on 100 parts by weight (dry weight) of the vinyl pyridine rubber copolymer, or blend of the same, the aqueous alkaline dip comprises the rubber, from about 8 to 75 parts by weight of the water soluble heat reactable o-cresol-formaldehyde-resorcinol resin and from about 250 to 1100 parts by weight of water. A minor amount by weight of wax (natural or synthetic) based on the rubber solids in the dip may be added to the dip, for example about 2 to 10 parts by weight of wax per 100 parts (dry) of the rubber. An example of a useful wax is a wax emulsion, a blend of paraffin microcrystalline waxes, total solids about 56.3%, active solids 50%, Wax Emulsion #5, General Latex & Chemical Corporation.

In order to provide data for the tire cord adhesive of this invention, a standard single-cord H-pull test is employed to determine the static adhesion at room temperature and above the adhesive-coated glass tire cord to rubber. All the data submitted herein including the working examples which follow are based upon identical test conditions, and all test specimens are prepared and tested in the same way generally in accordance with ASTM Designation: D 2138-67.

To apply the latex adhesive to the glass fiber cords in a reliable manner, the cords are fed through the adhesive dip bath while being maintained under a small predetermined tension and into a drying oven where they are dried under a small predetermined tension (to prevent sagging without any appreciable stretching). As the cords leave the oven they enter a cooling zone where they are air cooled before the tension is released. In each case the adhesive-coated cords leaving the dip are dried in the oven at from about 200° to 600° F. for from about 5–300 seconds, preferably at from about 400° to 500° F. for from about 90 to 30 seconds. The time the cord remains in the one-step adhesive is about a few seconds or so or at least for a period of time sufficient to allow wetting of the cord and at least substantial total impregnation of the fibers of the cord. The drying or curing of the adhesive treated glass fiber cord may be accomplished in one or more ovens at different times and temperatures.

The single-cord H-pull test is then employed to determine the static adhesion of the dried adhesive coated glass fiber cords to rubber. In each case the rubber test specimens are made from the same standard type of vulcanizable rubber composition comprising rubber, reinforcing carbon black and the customary compounding and curing ingredients.

In every case the cords to be tested are placed in parallel positions in a multiple-strand mold of the type described in the single-cord H-pull adhesion test ASTM designated D 2138-67, the mold is filled with unvulcanized rubber of the above composition, the cords being maintained under a tension of 50 grams each, and the rubber is cured for 20 minutes at around 305° F. to the elastic state. Each rubber test specimen is ¼ inch thick and has a ⅜ inch cord embedment.

After the rubber has been cured, the hot cured rubber piece is removed from the mold, cooled and H-test specimens are cut from said piece, each specimen consisting of a single cord encased in rubber and having each end embedded in the center of a rubber tab or embedment having a length of around 1 inch or so. The specimens are then aged at least 16 hours at room temperature. The force required to separate the cord from the rubber is then determined at room temperature or 250° F. using an INSTRON tester provided with specimen grips. The maximum force in pounds required to separate the cord from the rubber is the H-adhesion value.

Cords or fabric coated with the adhesive of the present invention using the one-step or single dip of this invention can have from about 10 to 40% by weight (dry) solids of the adhesive dip on the cord based on the weight of the cord and can be used in the manufacture of carcasses, belts, flippers and chafers of radial, bias, or belted-bias passenger tires, truck tires, motorcycle and bicycle tires, off-the-road tires and airplane tires, and, also, in making transmission belts, V-belts, conveyor belts, hose, gaskets, rubbers, tarpaulins and the like.

While the adhesive containing glass fiber reinforcing element can be adhered to a vulcanizable blend of natural rubber, rubbery cis-polybutadiene and rubbery butadiene-styrene copolymer by curing the same in combination together, it is apparent that the heat cured adhesive containing glass fiber reinforcing element can be adhered to other vulcanizable rubbery materials, by curing or vulcanizing the same in combination with the rubber, such as one or more of the foregoing rubbers as well as nitrile rubbers, chloroprene rubbers, polyisoprenes, polybutadienes, vinyl pyridine rubbers, acrylic rubbers, isoprene-acrylonitrile rubbers and the like and mixtures of the same. These rubbers can be mixed with the usual compounding ingredients including sulfur, stearic acid, zinc oxide, magnesium oxide, accelerators, antioxidants and other curatives, rubber compounding ingredients and the like well known to those skilled in the art for the particular rubbers being employed.

The following examples will serve to illustrate the invention with more particularity to those skilled in the art. In these examples the parts are parts by weight unless otherwise indicated.

EXAMPLE I a. Solution A was prepared by mixing the following components:

| o-Cresol | 5.1g | .047 mol |
|---|---|---|
| 37% Formaldehyde in H$_2$O | 12.0g | .148 mol |
| 1N NaOH (4% NaOH in H$_2$O) | 2.0g | |
| | 19.1g | |

This solution was aged 3 days at room temperature (about 25° C.) before further use. Solution B was prepared by dissolving 5.1g (.046 mol) resorcinol in 13.3g of water.

Solution B was slowly added to solution A at room temperature and well mixed. This mixture was slowly added to 244 g vinyl pyridine latex (1) to produce a dip with about 40.8% total solids content. This dip was aged 20 hours before use and called Dip 1.

b. A control dip was prepared by mixing together:

| Resorcinol | 11.15g | 0.101 mol |
|---|---|---|
| 1N NaOH | 2.0g | |
| H$_2$O | 53.73g | |
| 37% Formaldehyde | 13.12g | 0.161 mol |

The resulting RF resin solution was aged 5 minutes and then mixed with 244g of the above noted vinyl pyridine latex. This dip had a solids content of about 35.8% and was designated as Dip 2.

Greige glass fiber cords (2) were passed through the dips and then into a long tube in which hot air was blown in a direction opposite to the movement of the cords. The temperature where the air entered the tube was 60° to 90° F. higher than the temperature at the exit end of the tube. The highest temperature during the drying, curing or heat setting of the dipped cords was about 425° F., and the time in the tube was about 45 seconds. After said drying and curing, the adhesive treated cords were laminated with standard type rubber compounded stocks A or B, and molded, and the resulting assembly was cured for 20 minutes at 305° F. After curing, the assembly was removed from the mold, cooled and tested according to the H-adhesion test described supra. The H-adhesions of the cords, cord tensiles and folding test results are shown in Table I below:

Table I

| | Dip 1 | Dip 2 |
|---|---|---|
| DPU, % (3) | 21.4 | 18.7 |
| Tensile, lbs. (4) | 65.0 | 71.7 |
| H-Adhesion, lbs. | | |
| Rubber Stock A | | |
| At room temp. (about 25° C.) | 44.2 | 42.9 |
| at 250° F. | 26.7 | 25.6 |
| At room temp. after aging 24 hrs. at 300° F. in H$_2$O in sealed container | 34.4 | 25.6 |
| Rubber Stock B | | |
| At room temp. (about 25° C.) | 25.6 | 30.5 |
| at 250° F. | 16.9 | 20.9 |
| At room temp. after aging 24 hrs. at 300° F. in H$_2$O in sealed container | 16.8 | 11.7 |
| Folding Test (5) | 2877 | 44 |

Notes:
(1) Aqueous alkaline dispersion of a rubbery terpolymer of about 65.5 parts by weight of butadiene-1,3,23.5 parts of styrene and 11 parts of 2-vinyl pyridine, 41% by weight total solids (about 39% by weight rubber solids, balance surfactant, stabilizer, etc.), Mooney viscosity ML-4 min. at 212° F. = about 80–110, emulsion polymerized, freeze stable.
(2) G-15 cord, E glass, single strand tire cord of 2040 glass filaments, Owens-Corning Fiberglas Corporation which may contain a size composition.
(3) Dip pickup. Percent by weight of glass. Pickup determined by ignition loss.
(4) Test used was ASTM D 2970. Undipped G-15 cords of E glass exhibit tensiles of 43–44 pounds. Tests on adhesive dipped and heat set cords.
(5) Number of folds to break on Tinius Olson paper folding instrument (M.I.T. Folding and Endurance Tester), ASTM-D-2176-69. Tests on adhesive dipped and heat set cords.

| Rubber Stocks Used In Above Tests | |
|---|---|
| Stock A | Parts by Weight |
| Natural rubber | 46.64 |
| Butadiene-styrene rubbery copolymer, average 23.5% bound styrene, SBR-1500, emulsion polymerized | 38.5 |
| Polybutadiene, solution polymerized BD, about 93% cis-1,4, Raw Mooney ML-4 at 212° F. about 40–50 | 15.0 |
| Carbon black, fast extrusion furnace | 45.0 |
| Hydrated silica, "Hi-Sil" 233, PPG Industries, Inc. | 15.0 |
| "BLE" 25 antioxidant, a high temperature reaction product of diphenylamine and acetone, Naugatuck Chemical Division of Uniroyal | 2.0 |
| Processing oil, a blend of highly aromatic petroleum fractions | 5.0 |
| Zinc oxide | 3.0 |
| Stearic acid | 1.5 |
| "Cohedur" RL, a 1:1 mixture of resorcinol and "Cohedur" A (the pentamethyl ether of hexamethylol melamine) which is a colorless, viscous liquid which liberates formaldehyde on heating. Naftone, Inc.) | 4.7 |
| N-tert-butyl-2-benzothiazole-sulfenamide, "Santocure" NS, Monsanto Chemical Co. | 1.2 |
| Sulfur | 3.0 |
| Stock B | Parts by Weight |
| Natural Rubber | 50 |
| Butadiene-styrene rubbery copolymer, average 23.5% bound styrene, SBR-1502, emulsion polymerized | 50 |
| High abrasion furnace carbon black | 35 |
| "Endor", activated zinc salt of pentachloro-thiophenol, peptizing agent, du Pont | 0.5 |
| "Circosol" 2HX, naphthenic type oil Sun Oil Company | 7.0 |
| Zinc Oxide | 3.0 |
| Stearic Acid | 1.0 |
| "Agerite Spar", a mixture of mono-, di- and tri-styrenated phenols, | 1.0 |

| -continued Rubber Stocks Used In Above Tests | |
|---|---|
| antioxidant, R. T. Vanderbilt Co., Inc. | |
| "Picco 100", alkyl aromatic polyindene resin, reinforcing and processing oil, Pennsylvania Industrial Chemical Corp. | 2.0 |
| Diphenylguanidine | 0.5 |
| N-Oxydiethylene benzothiazole-2-sulfenamide | 0.9 |
| Sulfur (insoluble) | 2.60 |

EXAMPLE II

The method of this example was similar to that of Example I, above, except that the dip cords were passed through an oven in a few seconds at a relatively high temperature, ca. 600° F. Moreover, there were added to the dip about 6 parts of wax on 100 parts of latex solids prior to dipping. The results on testing are shown below in Table II:

Table II

| | Dip 1 | Dip 2 |
|---|---|---|
| DPU, % (3) | 15.3 | 14.6 |
| Dip Stability: Viscosity, cps Storage Time, Days | | |
| 1 | 21.5 | 9.5 |
| 19 | 25.5 | 20.5 |
| 40 | 28.0 | 24.2 |
| Tensile, lbs. (4) orig. | 62.9 | 66.0 |
| Tensile, lbs. after humidity aging, 3 days at 174° F. in H$_2$O in sealed container | 61.5 | 64.8 |
| H-Adhesion lbs. | | |
| Rubber Stock A | | |
| Room temperature | 37.0 | 31.5 |
| at 250° F. | 23.4 | 21.1 |
| At room temp. after aging 24 hrs. at 300° F. in H$_2$O in sealed container | 31.3 | 19.5 |
| Rubber Stock B | | |
| Room temperature | 22.5 | 20.9 |
| at 250° F. | 13.7 | 14.1 |
| At room temp. after aging 24 hrs. at 300° F. in H$_2$O in sealed container | 12.7 | 12.7 |
| Peel Adhesion, lbs. (6) | | |
| Room temperature | 29.2 | 15.9 |
| at 250° F. | 22.0 | 13.5 |
| At room temp. after aging 24 hrs. at 300° F. in H$_2$O in sealed container | 7.4 | 1.1 |

(6) Peel adhesion is Chemstrand Strip Adhesion which is a modified ASTM D-2630-71.

EXAMPLE III

Films were prepared from Dips 1 and 2. Before casting the films 20 grams of a 10% aqueous solution of the potassium salt of isomerized rosin acid (a surfactant, Dresinate 214, Hercules Incorporated) were added to each 50g of dip to make the films continuous. After casting the films were cured for 10 minutes at 310° F. The results of the tests on the films are shown below in Table III:

Table III

| | Dip 1 | Dip 2 |
|---|---|---|
| Modulus, psi | | |
| 5% | 335 | 569 |
| 10% | 455 | 738 |
| 15% | 536 | 756 |
| 20% | 591 | 800 |
| 25% | 626 | 844 |
| Tensile, psi | 653 | 1354 |
| Elongation, % | 368 | 100 |

Dips were prepared similar to Dip 1 of Example I, above, except that the o-cresol, resorcinol and formaldehyde were mixed together. The glass cords were greige Owens-Corning Fiberglas Corporation or PPG Industries, Incorporated glass cords where 5 yarns were plied together and dipped to give a 75 5/0 tire cord construction. The cords were predried at 215° F. and cured at 425° F. The weight ratio of o-cresol to resorcinol in the resin was 25:75, 37.5:62.5 and 50:50. Similar dips were prepared in which the o-cresol was replaced with m-cresol, p-cresol, p-ethyl phenol and p-methoxy phenol. The dip pickups varied from about 11 to 18%. The H-adhesions and cord tensiles for the dips containing the resins made with o-cresol were on the average higher than the H-adhesions and cord tensiles for the dips where the resin was made with the other substituted phenols.

The embodiments of the invention in which an exclusive property or privilege is claimed are defined as follows:

1. A composition of matter consisting essentially of an aqueous alkaline dispersion of 100 parts by weight of a rubbery vinyl pyridine copolymer, from about 8 to 75 parts by weight of a water soluble, heat reactable o-cresol-formaldehyde-resorcinol resin,
and from about 250 to 1100 parts by weight of water, the mol ratio of the o-cresol to the resorcinol being from about 1:1 to 1:5 and the mols of formaldehyde being in excess of the total mols of the o-cresol and resorcinol in the resin.

2. A composition of matter according to claim 1 where said rubbery vinyl pyridine copolymer is a copolymer of from about 60 to 80% by weight of butadiene-1,3, from about 7 to 32% by weight of styrene, and from about 5 to 22% by weight of 2-vinyl pyridine.

3. A composition of matter according to claim 2 where said o-cresol is reacted with the formaldehyde prior to the reaction with resorcinol to form said resin and where the mol ratio of the total mols of the o-cresol plus the resorcinol to the formaldehyde is from about 1:1.4 to 1:2.0.

4. A composition of matter according to claim 2 where said o-cresol-formaldehyde-resorcinol resin is used in an amount of from about 10 to 55 parts by weight and where said composition contains additionally a minor amount by weight of a wax based on the weight of said rubbery copolymer.

5. A composition of matter according to claim 1 where said o-cresol is reacted with said formaldehyde prior to the reaction with said resorcinol to form said resin.

6. A composition of matter according to claim 1 where the mol ratio of the total mols of the o-cresol plus the resorcinol to the formaldehyde in the resin is from about 1:1.4 to 1:2.0.

7. An aqueous alkaline solution of water soluble, heat reactable o-cresol-formaldehyde-resorcinol resin where the mol ratio of the o-cresol to the resorcinol is from about 1:1 to 1:5 and where the mols of formaldehyde are in excess of the total mols of the o-cresol and resorcinol in the resin.

8. A solution according to claim 7 where said o-cresol is reacted with said formaldehyde prior to reaction with said resorcinol.

9. A solution according to claim 7 where the mol ratio of the total mols of the o-cresol plus the resorcinol to the formaldehyde is from about 1:1.4 to 1:2.0.

10. A solution according to claim 7 where said o-cresol is reacted with the formaldehyde prior to the reaction with the resorcinol to form said resin and where the mol ratio of the total mols of the o-cresol plus the resorcinol to the formaldehyde is from about 1:1.4 to 1:2.0.

* * * * *